United States Patent
Stefanini et al.

(10) Patent No.: US 10,943,150 B2
(45) Date of Patent: Mar. 9, 2021

(54) SMART TRIGGER

(71) Applicant: Datalogic IP Tech S.r.l., Lippo di Calderara di Reno (IT)

(72) Inventors: Simone Stefanini, Bologna (IT); Mauro Pecorari, Port Potenza Picena (IT); Roberto Moschini, Bologna (IT); Davide Gavioli, San Vito di Spilamberto (IT)

(73) Assignee: DATALOGIC IP TECH S.R.L., Lippo di Calderara (IT)

( * ) Notice: Subject to any disclaimer, the term of this patent is extended or adjusted under 35 U.S.C. 154(b) by 56 days.

(21) Appl. No.: 16/382,867

(22) Filed: Apr. 12, 2019

(65) Prior Publication Data
US 2020/0327376 A1    Oct. 15, 2020

(51) Int. Cl.
| | | |
|---|---|---|
| *G06K 9/62* | (2006.01) | |
| *G08B 6/00* | (2006.01) | |
| *G06K 7/10* | (2006.01) | |
| *H04W 12/06* | (2009.01) | |
| *B06B 1/06* | (2006.01) | |
| *H04W 12/00* | (2009.01) | |

(52) U.S. Cl.
CPC ........... *G06K 9/6262* (2013.01); *B06B 1/0644* (2013.01); *G06K 7/10386* (2013.01); *G06K 7/10881* (2013.01); *G08B 6/00* (2013.01); *H04W 12/00508* (2019.01); *H04W 12/06* (2013.01)

(58) Field of Classification Search
CPC ............. G06K 9/6262; G06K 7/10386; G06K 7/10881; H04W 12/00508; H04W 12/06; B06B 1/0644; G08B 6/00
See application file for complete search history.

(56) References Cited

U.S. PATENT DOCUMENTS

| | | | |
|---|---|---|---|
| 6,394,355 B1 * | 5/2002 | Schlieffers | G06K 7/10881 235/462.45 |
| 9,898,642 B2 | 2/2018 | Han et al. | |
| 10,002,273 B1 * | 6/2018 | Dreselly Thomas | G06K 19/06028 |
| 2012/0067944 A1 * | 3/2012 | Ross | G06K 7/1095 235/375 |
| 2015/0279180 A1 * | 10/2015 | Taylor | G08B 6/00 340/407.1 |
| 2016/0063285 A1 * | 3/2016 | Rambler | G06K 7/10821 235/435 |
| 2016/0163142 A1 * | 6/2016 | Auger | G06K 7/1447 235/375 |
| 2017/0364726 A1 | 12/2017 | Buchan et al. | |
| 2018/0225490 A1 * | 8/2018 | Lewis | G07G 1/0081 |

FOREIGN PATENT DOCUMENTS

GB    2409558 A    6/2005

* cited by examiner

*Primary Examiner* — Brenda C Bernardi
(74) *Attorney, Agent, or Firm* — Shook, Hardy & Bacon, L.L.P.

(57) ABSTRACT

A scanner that includes a pressure-sensitive component and a haptic feedback component. The pressure-sensitive component can active a function of the scanner. The scanner may include a biometric-sensitive component which may activate additional or similar functions of the scanner. When a function is activated, a plurality of haptic feedbacks may be presented by the haptic feedback component. A method of manufacturing the scanner is also provided.

20 Claims, 7 Drawing Sheets

SMART TRIGGER

TECHNICAL FIELD

The field relates to scanners and indicia-reading technology for the same.

BACKGROUND

A bar code is a coded pattern of graphical indicia having a series or pattern of bars and spaces of varying widths that encode information. Bar codes may be one dimensional (e.g., a UPC bar code) or two dimensional (e.g., a QR code). Systems that read and decode bar codes often employ camera systems. These camera systems that read and decode bar codes are typically referred to as imaging-based bar code readers ("bar code readers") or bar code scanners. Some bar code readers are handheld ("handheld barcode scanners").

Handheld barcode scanners often include features such as a trigger, an LED, and/or a beeper. The LED and/or beeper may be used to provide feedback to the user of the scanner, for example by indicating that an item has been scanned. In use, a user actuates a mechanical trigger, which activates a camera system to read and decode a barcode.

Handheld barcode readers in many cases have limited user interface elements. The presence of multiple user interface elements can detract from productivity and/or increase the failure rate of products in some cases.

Scanning using a handheld barcode scanner typically occurs when the trigger is pressed or actuated. The actuation of the trigger is an important design characteristic as the amount of force required and distance to actuate the trigger can be a characteristic of a particular manufacturer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In brief, and at a high level, this disclosure describes, among other things, a scanner configured to detect biometric data such as a fingerprint and in response perform various functions and/or provide different types of haptic feedback. The scanner may also or alternatively include a pressure-sensitive component that reads a pressure exerted on it by an object (e.g., a finger), where various pressures can enable, activate, and/or control various functions of the scanner, such as reading and/or scanning a machine-readable indicia (e.g., a barcode), and based on the pressure and/or the function, the scanner may provide associated haptic feedback.

In a first aspect of the technology, a scanner useable for scanning machine-readable indicia is provided. The scanner comprises a pressure-sensitive component, a haptic feedback component, and one or more processors. The pressure-sensitive component presents an external active surface where a pressure can be applied by a user. The pressure-sensitive component is also adapted to activate at least one function of the scanner. The haptic feedback component is adapted to provide a plurality of haptic feedbacks, where each of the plurality of haptic feedbacks may be provided on a surface at least in part coincident with the external active surface of the pressure-sensitive component. The one or more processors are communicatively connected to the pressure-sensitive component and the haptic feedback component. The one or more computer processors are operable to activate a first haptic feedback or a second haptic feedback of the plurality of haptic feedbacks in response to a first function of the at least one function of the scanner being activated.

In another aspect of the technology, a scanner useable for scanning machine-readable indicia is provided. The scanner includes a biometric-sensitive component, a haptic feedback component, and one or more processors. The biometric-sensitive component is adapted to enable activation of a first plurality of functions of the scanner or a second plurality of functions of the scanner. The first plurality of functions of the scanner are enabled based on at least a first biometric contact being detected by the biometric-sensitive component. The second plurality of functions of the scanner are enabled based on at least a second biometric contact being detected by the biometric-sensitive component. In some aspects, the first biometric contact and the second biometric contact are associated with different users. The haptic feedback component is adapted to provide a plurality of haptic feedbacks. The one or more computer processors are communicatively connected to the biometric-sensitive component and the haptic feedback component and are operable to activate a first haptic feedback or a second haptic feedback of the plurality of haptic feedbacks based on one of the first plurality of functions being activated.

In another aspect of the technology, a method of manufacturing a scanner useable for reading machine-readable indicia is provided. The method comprises coupling one or more computer processors to a housing of the scanner and coupling a pressure-sensitive component to the housing of the scanner, where the pressure-sensitive component is adapted to activate a first plurality of functions of the scanner. The method further comprises coupling a haptic feedback component to the housing of the scanner, the haptic feedback component adapted to provide a plurality of haptic feedbacks. Each one of the plurality of haptic feedbacks is provided on a surface at least in part coincident with an external active surface of the pressure-sensitive component. The pressure-sensitive component and the haptic feedback component are communicatively connected to the one or more computer processors. The one or more computer processors are operable to activate a first haptic feedback or a second haptic feedback of the plurality of haptic feedbacks in response to a first function of the at least one function of the scanner being activated.

BRIEF DESCRIPTION OF THE DRAWINGS

The various objects, features and advantages of the present technology are explained in detail below with reference to the attached drawing figures, wherein.

DETAILED DESCRIPTION

Figure 1:
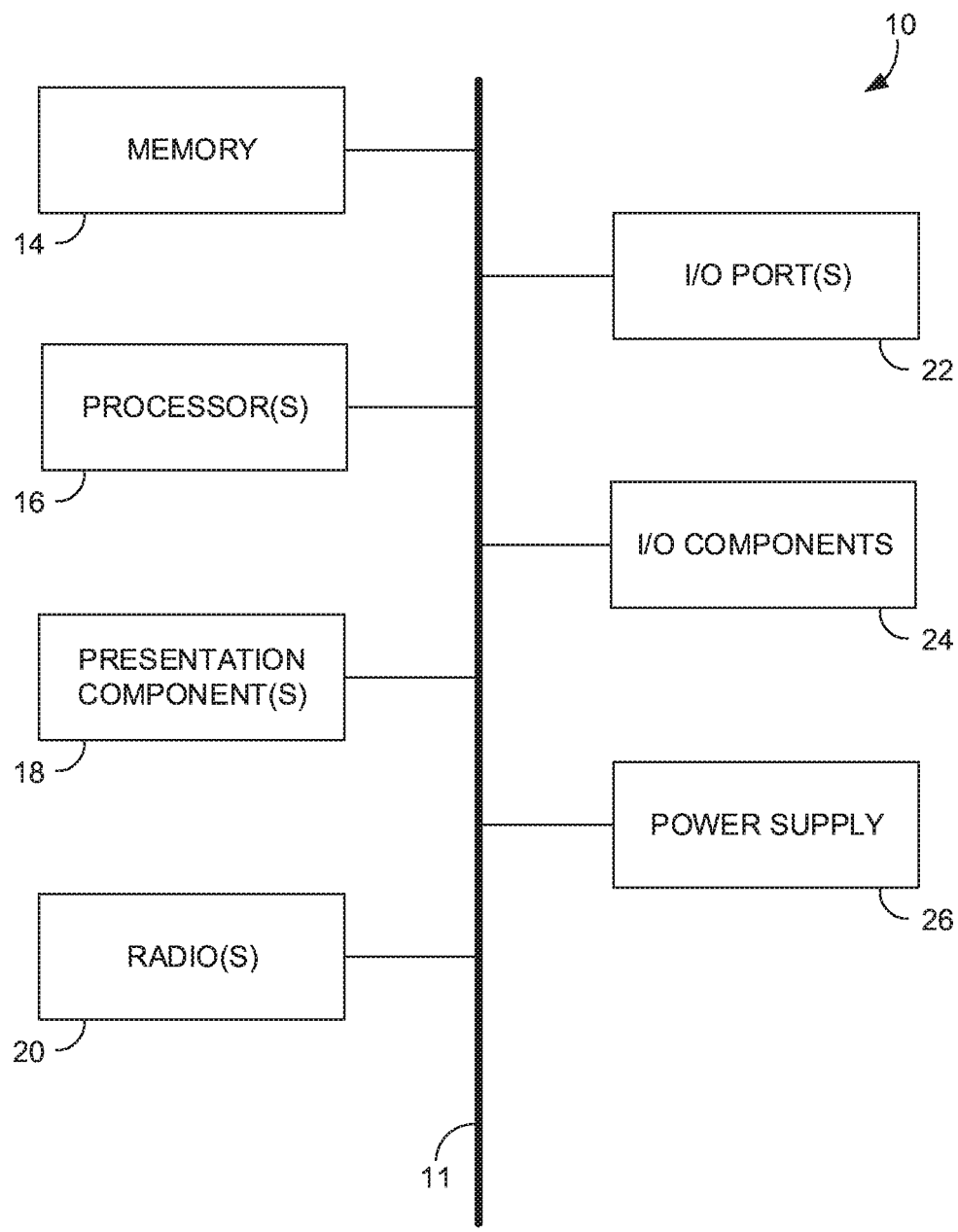
FIG. 1 depicts an example computing system suitable for use with aspects of the present technology.

The subject matter of the present technology is described with specificity herein to meet statutory requirements. However, the description itself is not intended to limit the scope of the technology. Rather, the claimed subject matter may be embodied in other ways, to include different elements, steps, and/or combinations of elements or steps, similar to the ones described in this disclosure, and in conjunction with other present or future technologies. Moreover, although the terms "step" and "block" may be used herein to connote different elements of various methods employed, the terms should not be interpreted as implying any particular order among or between various steps or blocks unless and except when the order of individual steps or blocks is explicitly described and required.

At a high level, the present technology relates generally to a scanner configured to read a biometric data, e.g., a fingerprint, and/or detect a pressure applied to a component of the scanner in order to activate various functions of the scanner while also providing different types of haptic feedback. In one aspect, the scanner includes at least one pressure-sensitive component, at least one haptic feedback component, at least one biometric-sensitive component, and one or more computer processors communicatively connected to the aforementioned components. The pressure-sensitive component may be a piezoelectric component, and the haptic feedback component, when activated to provide a haptic feedback, may apply a current to the piezoelectric component to create the haptic feedback. The haptic feedback component, when activated, may provide each of the plurality of haptic feedbacks on a surface at least in part coincident with an external active surface of the pressure-sensitive component. The biometric-sensitive component may be a fingerprint reader or another type of biometric reader. In some aspects, the various functions of the scanner include scanning an indicia. The scanning function may be activated by the pressure-sensitive component and/or the biometric-sensitive component. Additional aspects of the present technology related to scanners and feedback-generating systems for the same are described in greater detail below with reference to accompanying FIGS. 1-6.

Aspects of the present technology may be provided herein as, among other things, a method, a system, and/or a computer-program product. Accordingly, the aspects may take the form of a hardware aspect, and/or may take the form of an aspect combining software and hardware. The present technology may also take the form of a computer-program product that includes computer-useable instructions embodied on one or more computer-readable media. The present technology may further be implemented as hard-coded into the mechanical design of scanning components or devices, may be built into a scanner, and/or may be integrated into a scanning system including one or more computing processing components.

Computer-readable media includes both volatile and nonvolatile media, removable and non-removable media, and contemplate media readable by a database, a switch, and/or various other network devices. Network switches, routers, and related components are conventional in nature, as are methods of communicating with the same. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided herein.

Various components are described within. A pressure-sensitive component may be a piezoelectric layer capable of detecting or receiving ultrasonic waves or signals. A biometric-sensitive component may be a fingerprint reading layer or other biometric-detecting component that allows for detecting and identifying a user.

A scanner as described herein can be configured to read a machine-readable indicia (an "indicia"). Indicia are barcodes, UPC labels, and other means of identifying an object. In some aspects of the present technology, the scanner may be able to identify/recognize objects being scanned. In further aspects, the scanner may be able to identify writing or text that describes an object, such as by using image-based text recognition or optical character recognition ("OCR").

Referring now to FIG. 1, a block diagram of an example computing device 10 (also referred to herein as a main processing system) suitable for use with aspects of the present technology, including a scanner as described herein, is provided. It should be noted that although some components in FIG. 1 are shown in the singular, they may be plural. For example, the computing device 10 might include multiple processors or multiple radios. As shown in FIG. 1, the computing device 10 includes a bus 11 that directly or indirectly couples various components together, including memory 14, processor(s) 16, presentation component(s) 18 (if applicable), radio(s) 20, input/output (I/O) port(s) 22, input/output (I/O) component(s) 24, and a power supply 26.

Memory 14 may take the form of memory components described herein. Thus, further elaboration will not be provided here, but it should be noted that the memory 14 may include any type of tangible medium that is capable of storing information, such as a database. A database may be any collection of records, data, and/or information. In one aspect, memory 14 may include a set of embodied computer-executable instructions that, when executed, facilitate various functions or elements disclosed herein. These embodied instructions will variously be referred to as "instructions" or an "application" for short. Processor 16 may actually be multiple processors that receive instructions and process them accordingly. Presentation component 18 may include a display, a speaker, and/or other components that may present information (e.g., a display, a screen, a lamp (LED), a graphical user interface (GUI), and/or even lighted keyboards) through visual, auditory, and/or other tactile cues.

The radio 20 may facilitate communication with a network, and may additionally or alternatively facilitate other types of wireless communications, such as Wi-Fi, WiMAX, LTE, and/or other VoIP communications. In various aspects, the radio 20 may be configured to support multiple technologies, and/or multiple radios may be configured and utilized to support multiple technologies.

The input/output (I/O) ports 22 may take a variety of forms. Example I/O ports may include a USB jack, a stereo jack, an infrared port, a firewire port, other proprietary communications ports, and the like. Input/output (I/O) components 24 may comprise keyboards, microphones, speakers, touchscreens, and/or any other item usable to directly or indirectly input data into the computing device 10.

Power supply 26 may include batteries, fuel cells, and/or any other component that may act as a power source to supply power to the computing device 10 or to other scanning components, including through one or more electrical connections or couplings. The power supply 26 may be configured to selectively supply power to different components independently and/or concurrently.

Figure 2A:
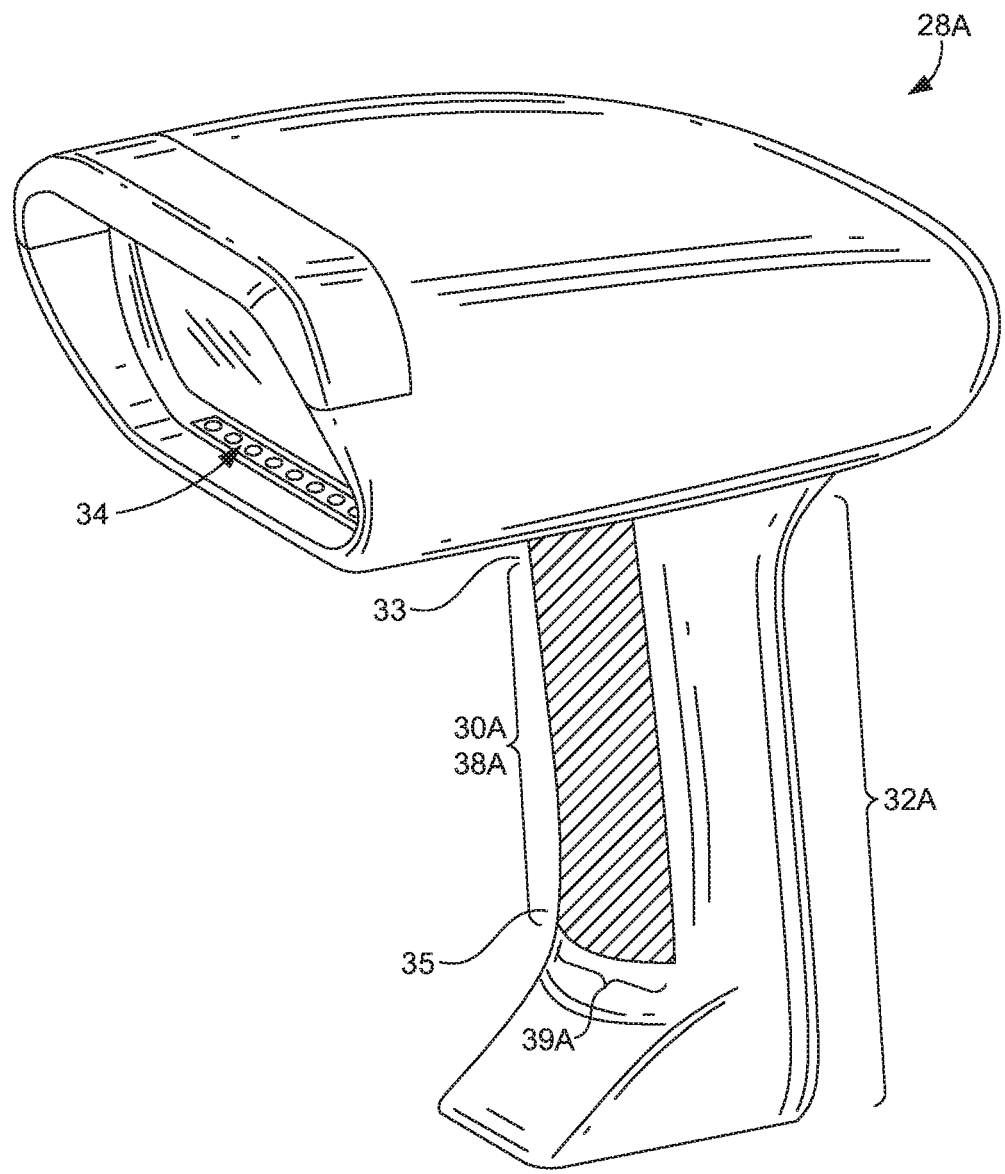
FIG. 2A depicts a scanner that includes a pressure-sensitive component along a handle, in accordance with an aspect of the present technology.

Referring to FIG. 2A, an example scanner 28A useable for scanning machine-readable indicia is provided, in accordance with an aspect of the present technology. The example scanner 28A shown in FIG. 2A includes a pressure-sensitive component 30A positioned on a handle 32A of the scanner 28A. The pressure-sensitive component 30A includes an external active surface 39A located along the handle 32A where a pressure can be applied by a user. The pressure-sensitive component 30A may be adapted to activate a plurality of functions of the scanner 28A based on the pressure applied to the pressure-sensitive component 30A, e.g., by a user. In some aspects, the pressure-sensitive component 30A can activate a first plurality of functions of the scanner 28A and/or a second plurality of functions of the scanner 28A, depending on a user-associated configuration that is activated, e.g., based on a biometric reading. The pressure-sensitive component 30A in one aspect is configured to receive a reading of pressure on the external active surface 39A and activate at least one function of the scanner 28A based on that reading of pressure. In further aspects, activation of the different functions of the scanner 28A may generate different haptic feedbacks at the external active surface 39A of the scanner 28A. As with many of the aspects described herein, the pressure-sensitive component 30A may be designed such that it requires limited or no mechanical or moving parts. For example, the pressure-sensitive component 30A may be designed so that a physically displacing component that indicates an applied pressure is not required. For example, in one contemplated aspect, the pressure-sensitive component 30A is a piezoelectric layer configured to detect an applied pressure.

The example scanner 28A shown in FIG. 2A further includes a biometric-sensitive component 38A that is adapted to activate and/or enable at least one function of the scanner 28A. As shown in FIG. 2A, the biometric-sensitive component 38A is integrated at least partially with the pressure-sensitive component 30A and/or is coincident with the pressure-sensitive component 30A. The biometric-sensitive component 38A may be configured so that it can detect biometric data from a biometric contact with the biometric-sensitive component 38A (e.g., from one or multiple finger contacts). Based on the biometric data(s) and/or the biometric contact(s), the computing device 10 may identify a user, or even the exact digit, e.g., finger of the user, that was placed on the biometric-sensitive component 38A. The computing device 10 may then, based on this identification, activate at least one function of the scanner 28A and/or enable a configuration of functions of the scanner 28A that are associated with that particular identified user.

Moreover, in this aspect, a single pressure of a user's finger may be detected by the pressure-sensitive component 30A, while the biometric-sensitive component 38A may detect the fingerprint of the user's finger used to apply the pressure. In operation, the pressure applied by the user's finger on the pressure-sensitive component 30A may activate at least one function of the scanner 28A. This at least one function, in one example, may be a scanning function used to scan an indicia. The biometric-sensitive component 38A may detect the fingerprint of the user and activate and/or enable a separate (or the same) at least one function of the scanner 28A. Continuing with the example, the detected fingerprint may be linked to a specific user, and when scanning the item, the detected fingerprint may link the specific user to the item scanned. In other example aspects, the detected fingerprint of the user and the pressure applied may both activate (in combination) at least one function of the scanner 28A. In one example, the pressure applied by the user's finger may activate the biometric-sensitive component 38A to collect biometric data to detect the user, thereby enabling and/or activating one or more functions of the scanner 28A, and/or enabling the scanner 28A to link certain data with the identified user.

The scanner may have a limited number of i/o components that are limited by design to reduce distraction and reduce the number of mechanical failure points. The scanner may incorporate a mechanical trigger which may use springs and screws to activate scanning of an indicia. However, aspects of the present technology further allow for a multitude of potential functions to be used with a common trigger configuration. Advantageously, aspects of the present technology may utilize components such as the pressure-sensitive component 30A and the biometric-sensitive component 38A to allow for these many functions or pluralities of functions to be executed without reduced incidence of these mechanical failures while still maintaining a limited number of i/o components on the scanner itself.

In one contemplated operation of the scanner 28A illustrated in FIG. 2A, a first pressure is detected by the pressure-sensitive component 30A of the scanner 28A and a first function of the scanner 28A is activated based on the detected first pressure (e.g., turning on the scanner 28A). For example, the first pressure can be applied by a user on the external active surface 39A located along the handle 32A. Then, a second pressure, e.g., one that is greater than the first pressure, is detected by the pressure-sensitive component 30A and a second function of the scanner 28A is activated (e.g., performing a read function on a machine-readable indicia). Accordingly, such a pressure-controlled configuration can, in one aspect, allow a user to hold a scanner 28A to turn on the scanner 28A (e.g., applying the first pressure), and then grip the scanner 28A more tightly to activate a read function so that the scanner 28A can scan a machine-readable indicia (e.g., applying the second pressure). This may allow for single-handed use and/or more efficient operation of the scanner 28A.

The scanner 28A may include a haptic-feedback component that is operable to generate a plurality of haptic feedbacks in order to indicate which function of the scanner 28A was enabled and/or activated, and/or to indicate the result of an activated function of the scanner 28A. For example, a first function may be associated with a first haptic feedback, and a second function may be associated with a second haptic feedback. As another example, when a scanning function is activated, and a scanned machine-readable indicia is successfully read (e.g., identified and decoded) by the scanner 28A, a first haptic feedback may be provided (e.g., a "completed scan" haptic feedback). In the same example, when a scanning function is activated but the machine-readable indicia is not successfully read (e.g., not identified and/or not decoded) by the scanner 28A, a second haptic feedback may be provided (e.g., a failed scan haptic feedback). The first feedback and second feedback may be distinct feedbacks the difference of which can be detected by a user of the scanner 28A. In this way, based on the feedback provided, the first haptic feedback or the second haptic feedback may help a user identify the result of the function executed by the scanner 28A, providing greater efficiency in performing different scanning operations.

In an alternative configuration, the biometric-sensitive component 38A may be used in conjunction with haptic feedback to unlock the scanner 28A and/or enable additional and/or user-specific functions of the scanner 28A. To provide one example, a user may hold a scanner 28A to turn the scanner 28A on, which triggers a first haptic feedback. Then, the biometric-sensitive component 38A located on the scanner 28A may be used to identify the user of the scanner 28A based on a detected biometric data to unlock additional functionality, which triggers a second haptic feedback. The biometric-sensitive component 38A can, in contemplated aspects, be used to enable a set of functions of the scanner in this sense, or can be used to activate specific functions of the scanner 28A. Further, one plurality of functions of the scanner may be enabled by one biometric data that is detected by the biometric-sensitive component 38A and another plurality of functions of the scanner 28A may be enabled by a different biometric data detected by the biometric-sensitive component 38A. The biometric data may be related to a particular user, a particular hand, a particular finger, or another type of biometric data.

In one contemplated configuration, a scanner, such as the scanner 28A shown in FIG. 2A, may be configured with an illumination component 34 that is connected to a pressure-sensitive component 30A, such as the pressure-sensitive component 30A shown in FIG. 2A. Using these interconnected components, a first pressure may be applied to the pressure-sensitive component 30A of the scanner 28A to generate a first illumination level that is commensurate with the first pressure. A first haptic feedback may also be provided in association with the first illumination level being generated. Then, a second pressure may be applied to the pressure-sensitive component 30A of the scanner to generate a second illumination level that is commensurate with the second pressure. A second haptic feedback may be provided in association with the second illumination level being generated. In other words, a user may adjust a pressure applied to the pressure-sensitive component 30A to control a level of illumination emitted by the illumination component 34. Further, different illuminations may be used for different scanning operations (e.g., different types of scans), and thus, by providing different haptic feedbacks in association with different generated illumination levels and/or types of illumination that are activated for different scanning operations, a user can more efficiently control and/or determine which illumination level is in use, thereby supporting more efficient and effective scanning.

The pressure-sensitive component 30A may be operable to identify the number and/or position of digits (e.g., a user's fingers) on the handle 32A of the scanner 28A in a contemplated aspect. The pressure-sensitive component 30A may also be adapted to detect a location of a force (e.g., a contact) on the pressure-sensitive component 30A where contact is made and a pressure is applied. The pressure-sensitive component 30A may also be adapted to detect a number of simultaneous contacts. In this respect, the one or more computer processors may be operable to activate a function based on the detected location of the contact and/or based on the detected number of simultaneous forces and/or based on the number and position of digit contacts.

To provide an example operation of the scanner 28A shown in FIG. 2A, placing a digit proximate a first location 33 or a second location 35 on the pressure-sensitive component 30A may activate certain corresponding functions of the scanner 28A. For example, the scanner 28A may be configured so that a digit placed proximate the first location 33 on the pressure-sensitive component 30A activates the illumination component 34 to provide a first illumination level/type (e.g., a first level of lumens are emitted), and so that a digit placed proximate the second location 35 on the pressure-sensitive component 30A activates the illumination component 34 to provide a second illumination level/type (e.g., a second level of lumens are emitted).

In another example, two fingers (or e.g., two contacts of some type) occurring simultaneously on the pressure-sensitive component 30A may activate the scanner 28A to read an indicia or perform another function of the scanner 28A, which may have an associated haptic feedback. In another example, three fingers contacting the pressure-sensitive component 30A simultaneously may activate the illumination component 34 or another function of the scanner 28A. Other number-of-contact-based activations and controls are contemplated herein (e.g., selection of different types of scan functions, selection of different illumination patterns or levels, switching between profiles of users, and even increasing or decreasing the haptic feedback, etc.).

With continued reference to the scanner 28A shown in FIG. 2A, the biometric-sensitive component 38A of the scanner 28A, when incorporated, may also be adapted to enable and/or activate a plurality of functions of the scanner 28A. The biometric-sensitive component 38A may be operable to identify the number of digits and which digits are placed on the biometric-sensitive component 38A. In some aspects, a specific digit may activate a corresponding function of the scanner 28A. In further aspects, a specific digit, such as the middle digit of a human hand, may activate a first function of a plurality of functions of the scanner 28A which may result in generation of a first or a second haptic feedback (e.g., in response to a first result of the function or a second result of the function). For example, the detection of such a digit may activate the function of increasing the number of lumens presented or altering the magnitude and/or quantity of haptic feedbacks. In the same example, biometric data collected from the biometric-sensitive component 38A may identify the digit to relate to a specific user and unlock the scanner 28A for further functions, alter the haptic feedback to the user's preference, or enable and/or activate other operations.

In some aspects, the scanner 28A may include an alert component. The alert component may be an audio device (e.g., a noise-generating device such as a speaker or beeper), a visual indicator (e.g., an LED or other type of light-emitting or visual display device), or another type of alert component (e.g., a tactile or haptic feedback-based component). In these aspects, a biometric data detected by the biometric-sensitive component 38A and/or a pressure detected by the pressure-sensitive component 30A may be used to adjust the alert component. For example, when the alert component is a beeper, specific biometric data such as a user's middle finger, can increase the beeper volume when the scanner 28A is configured to allow such an adjustment, and specific biometric data, such as a user's ring finger, can be used to decrease the beeper volume when the scanner is configured to allow such an adjustment.

In one example aspect, a biometric contact that is detected by the biometric-sensitive component 38A may be used by the computing device 10 to activate a particular function such as unlocking the scanner 28A for operation. For example, the biometric contact may be used to identify a user of the scanner 28A, and the computing device 10 may further identify that the user meets a security threshold such that it allows the user to activate additional functions of the scanner 28A (e.g., a scanning functionality or a scanning functionality associated with the user's profile). In certain instances, the biometric contact may be used to determine that a user is of a sufficient security threshold to allow activation of some scanning functions but not other scanning functions. For example, the user may be able to use or adjust scanning functions but otherwise not adjust certain operational aspects of the scanner 28A (e.g., alert type, alert volume, feedback required for activation of certain functions, etc.).

In some aspects, the scanner 28A may identify a user and automatically associate the scanner 28A with a particular user and/or user's profile in a computing system. The scanner 28A may also identify a user and automatically associate the scanner 28A with a system, such as a cashier system. For example, one scanner 28A may be present at a plurality of checkout lanes in a store. A checkout clerk can present a biometric contact (e.g., a fingerprint) to associate the scanner 28A with the clerk's checkout line. In this way, the items scanned by the scanner 28A will be added to the register of the clerks checkout line. A second checkout clerk may take the same scanner 28A, scan their fingerprint, and the scanner 28A would be associated with that clerk's checkout line. In this way, the items scanned by the scanner 28A will be added to the register of the second clerk's checkout line.

In further contemplated aspects, the scanner 28A may be configured so that scan data generated from an item scan can be added to different lists based on a particular biometric contact that is detected by the biometric-sensitive component 38A of the scanner 28A. For example, the scanner 28A may, once having effectively scanned an item, add data associated with the item scan to one of a plurality of inventories and/or databases based on the type of biometric contact that was detected when the scanner was activated (e.g., based on which finger was used by a particular user and/or which hand was used by a particular user). In one contemplated scenario, a clerk may hold the scanner 28A and make a biometric contact with the scanner 28A using a first finger, scan an item, and the scanner would place the scanned item data into a first data location (e.g., a first inventory list). The clerk may then hold the scanner 28A and make a biometric contact with a second finger, scan the same or another item, and the scanner would place that scanned item data into a second data location (e.g., a second inventory list). In this way, as different items are scanned, and different scan data is obtained, the data can be managed and stored based on different biometric contacts or interactions, allowing a user to more efficiently direct, save, and/or assign scan data to a correct database and/or in a correct way, increasing the efficiency of the scanning process.

In a separate contemplated scenario, a clerk may hold the scanner 28A and make a biometric contact using a first finger, and as a result, the scanner 28A would place the scanned item data into a first list (e.g., a shopping cart of a first customer). The clerk may also hold the scanner 28A and make a biometric contact with a second finger and the scanner 28A would place the scanned item data into a second list (e.g., a shopping cart of a second customer). In this way, a clerk may scan two (or more) customers' orders by alternating between each customer without having to use two or more scanners, and/or without manually switching functions of the scanner or an associated computing system.

Figure 2B:
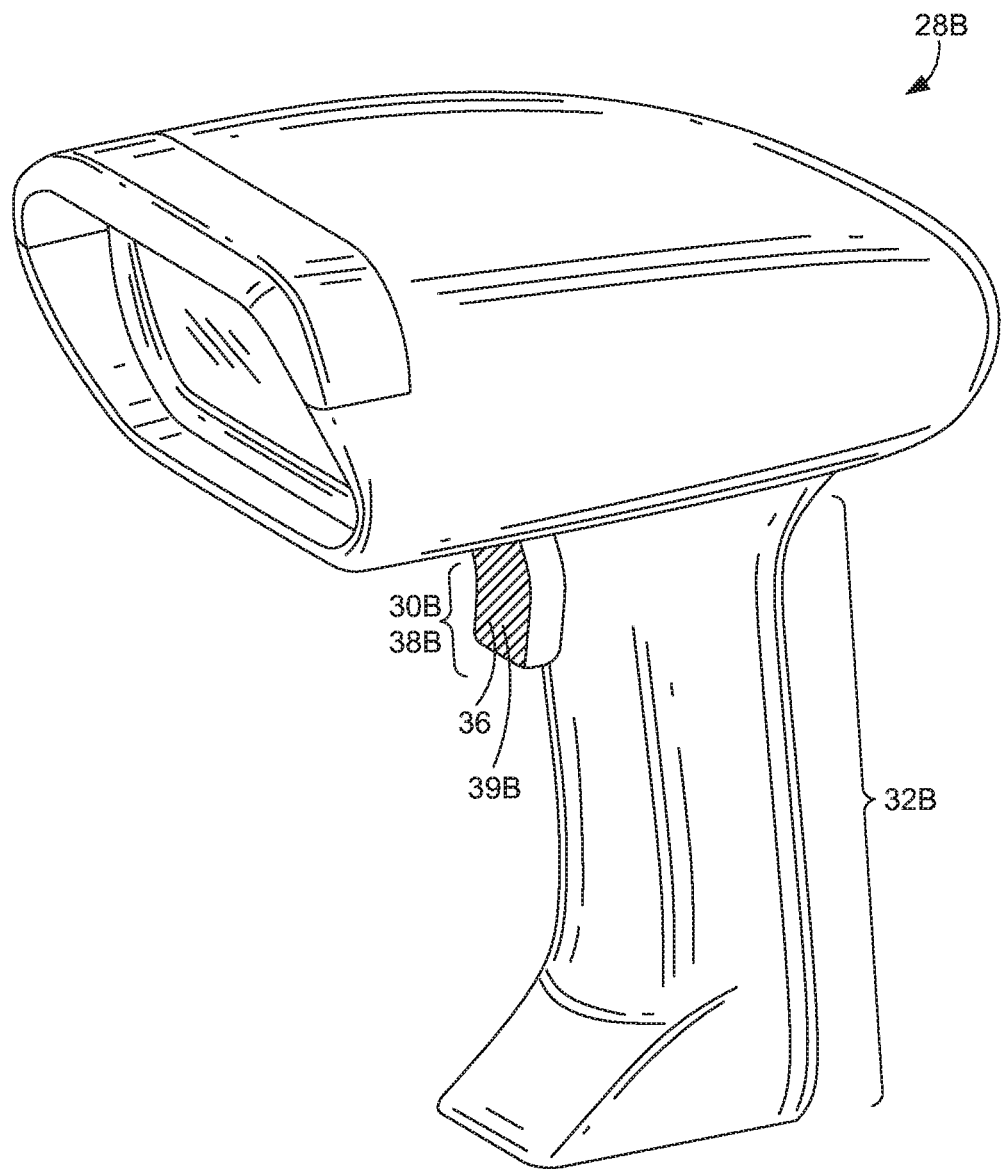
FIG. 2B depicts a scanner that includes a pressure-sensitive component at a receiving plate, in accordance with an aspect of the present technology.

In some contemplated aspects, the external active surface 39A of the pressure-sensitive component 30A may not comprise substantially an entire side surface of the handle 32A as shown in the illustrated aspect of FIG. 2A, but instead, may comprise only a portion of the side surface of the handle 32A, e.g., as shown with the scanner 28B shown in FIG. 2B. In such aspects, an entire hand of a user can grip the handle 32B of the scanner 28B, and several fingers of the gripping hand can then be used to exert a pressure on the pressure-sensitive component 30B. In some aspects, the biometric-sensitive component 38B may also not comprise the entire side surface of the handle as shown in the illustrated aspect of FIG. 2A, but may comprise part of the side surface as shown with the biometric-sensitive component 38B shown in FIG. 2B. Having only a portion of the handle 32B comprise the pressure-sensitive component 30B and/or the biometric-sensitive component 38B can allow a user to hold the scanner 28B and when desired activate a plurality of functions of the scanner 28B through pressure and/or biometric contact.

Referring now to FIG. 2B, another example scanner 28B is shown that includes a pressure-sensitive component 30B with an external active surface 39B located on a receiving plate 36 positioned on a handle 32B of the scanner 28B, in accordance with an aspect of the present technology. The receiving plate 36 occupies a different location on the handle 32B than the operable components shown in FIG. 2A. In this aspect, the pressure-sensitive component 30B and the haptic feedback component (as described in FIG. 3) may be adapted primarily to support single digit interaction. In some aspects, a biometric-sensitive component 38B may be integrated along the receiving plate 36 to provide functionality with the same as described herein.

It should be noted that numerous alternative scanner aspects according to the technology described herein are contemplated, including those having different arrangements, configurations, and selections of components. For example, the position of the pressure-sensitive component or the biometric-sensitive component on each scanner may be configured differently depending on the desired interaction with the user. For example, the pressure-sensitive component may be located on the side of the handle to allow engagement by a different digit of a user (e.g., a user's thumb) compared to the aspects shown in FIGS. 2A and 2B. As a further example, the biometric-sensitive component 38B may be located at one or multiple locations about a scanner to allow for identification of biometric contacts from different digits of a user (e.g., different fingers of a user). As such, the configurations of the scanners 28A and 28B shown in FIGS. 2A and 2B, respectively, and also the selection, positioning, and functionality of the components described in association therewith are intended to represent non-limiting examples of the present technology, and other configurations are contemplated.

Figure 3:
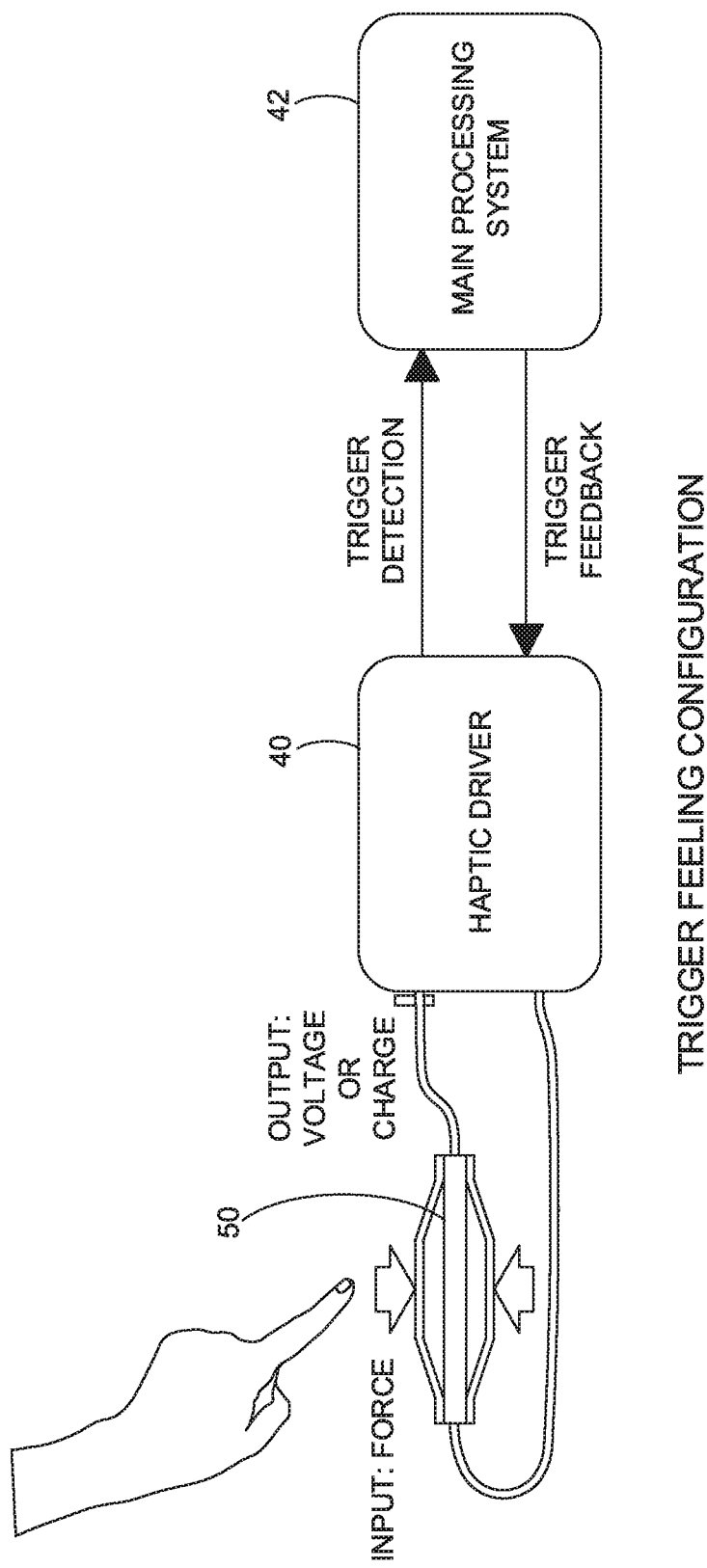
FIG. 3 depicts a block diagram showing a relationship between a haptic driver and a main processing system configured to provide feedback during operation of a scanner, in accordance with an aspect of the present technology.

Referring to FIG. 3, a block diagram depicting an example relationship between a haptic driver 40, a main processing system 42, and a pressure-sensitive component 50 configured to provide feedback during operation of a scanner (e.g., the scanners 28A and 28B shown in FIGS. 2A and 2B, respectively) is provided, in accordance with an aspect of the present technology. The haptic feedback component (e.g., the haptic driver 40) is adapted to provide a plurality of haptic feedbacks in response to one of the plurality of functions of the scanner or in response to the result of a function of the scanner (e.g., good read scan or missed scan) as described herein.

The pressure-sensitive component 50 of the scanner as described herein may be a piezoelectric device. When a piezoelectric device is used as the pressure-sensitive component 50, a haptic driver 40 can receive an output voltage or charge from a pressure being applied to the piezoelectric device. The haptic driver 40 may detect this pressure, and transfer the detection to a main processing system 42 (which may be the computing device 10 or another computer device and/or processor forming part of a scanner, such as the scanners 28A and/or 28B shown in FIGS. 2A and 2B, respectively). The main processing system 42 may then trigger a feedback indication to the haptic driver 40 which may input a voltage or charge across the pressure-sensitive component 50 to give a haptic feedback, e.g., a vibration. In some aspects, the haptic feedback component provides this haptic feedback in response to a function of the scanner being activated. In further aspects, different haptic feedbacks can be triggered and/or provided based on the result of the scanner function that is activated. For example, a first haptic feedback may be provided in response to a first result following a function of the scanner being activated (e.g., a correct scan of a machine-readable indicia having occurred), and a second haptic feedback may be provided in response to a second result following the function of the scanner being activated (e.g., a failed, incorrect, or insufficient scan of a machine-readable indicia having occurred).

Any number of haptic feedbacks corresponding to outcomes of a particular function, e.g., a scanning and/or illumination function, may be provided in contemplated aspects. For example, when a user applies a pressure to the pressure-sensitive component 50, a first function may be executed, such as scanning an indicia. Once the function is activated a trigger feedback (haptic feedback related to scanning an indicia) may be activated. The trigger feedback can help signify to the user that a first function was activated.

In some aspects where the scanner includes a biometric-sensitive component (example aspects shown in FIGS. 2A and 2B), user preferences for haptic feedback may be implemented. For example, when the scanner determines, using the biometric-sensitive component, an identity of the user, the level of haptic feedback may be adjusted or enabled based on user-defined preferences. The user may set these preferences by activating and/or adjusting various functions as described herein, and the scanner may store in memory the functions customized for the specific user. For example, a user may desire more intense haptic feedback. The scanner may identify the user through the biometric-sensitive component, and then, the user may place a digit at a certain position, such as proximate the first location 33 on the scanner 28A shown in FIG. 2A, to adjust, e.g., increase, the level of haptic feedback. The scanner may store in memory the increased setting for haptic feedback for the user next time the user is identified by the scanner.

To provide a further example of such functionality implementation, one store clerk may desire more intense levels of haptic feedback for any functions or for a particular function of the scanner that is/are activated, and therefore may adjust the scanner to have a higher haptic feedback setting. Another store clerk may desire relatively less intense levels of haptic feedback for any function or for a particular function, and therefore may set the scanner to have a lower haptic feedback setting. When the first store clerk uses the scanner, the scanner may identify the store clerk and then automatically send the more intense haptic feedbacks previously configured and stored in association with the first store clerk's profile.

Figure 4:
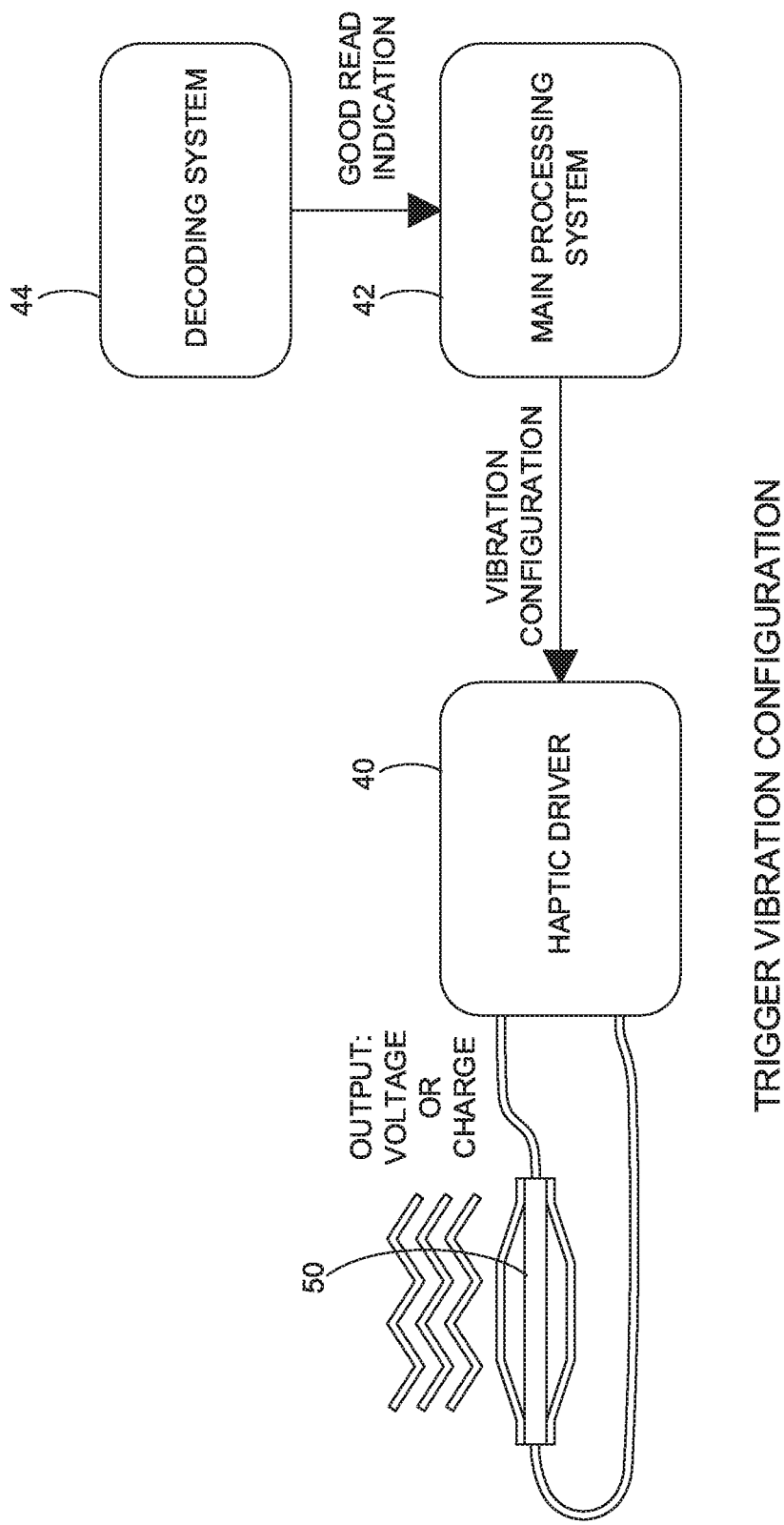
FIG. 4 depicts a block diagram showing a relationship between a haptic driver and a main processing system configured to provide feedback related to a certain operation of a scanner, in accordance with an aspect of the present technology.

Referring to FIG. 4, a block diagram of a relationship between the haptic driver 40, a main processing system 42, a pressure-sensitive component 50, and a decoding system 44 configured to provide feedback (e.g., feedback indicating a "good read" scan) are shown, in accordance with an aspect of the present technology. In some aspects, the decoding system 44 may be a function of the main processing system 42. In aspects with the biometric-sensitive component (e.g. such as the biometric-sensitive component 38A and 38B as shown in FIGS. 2A and 2B), user data may be collected such as biometric data from a biometric contact.

The decoding system 44 in FIG. 4 may ensure a threshold is met in the placement of the biometric contact. In one example, when biometric data is collected, the decoding system 44 may send to the main processing system 42 a clear biometric read indication, which is a notification that the biometric data is received. The main processing system 42 may then send an instruction to the haptic driver 40 to provide a haptic feedback. In other words, the decoding system 44 can determine a biometric contact (like a finger touch) is sufficiently placed for biometric data to be collected. Then, a haptic feedback may be provided to the user to alert them that their biometric data was collected (e.g., successfully or unsuccessfully).

Figure 5:
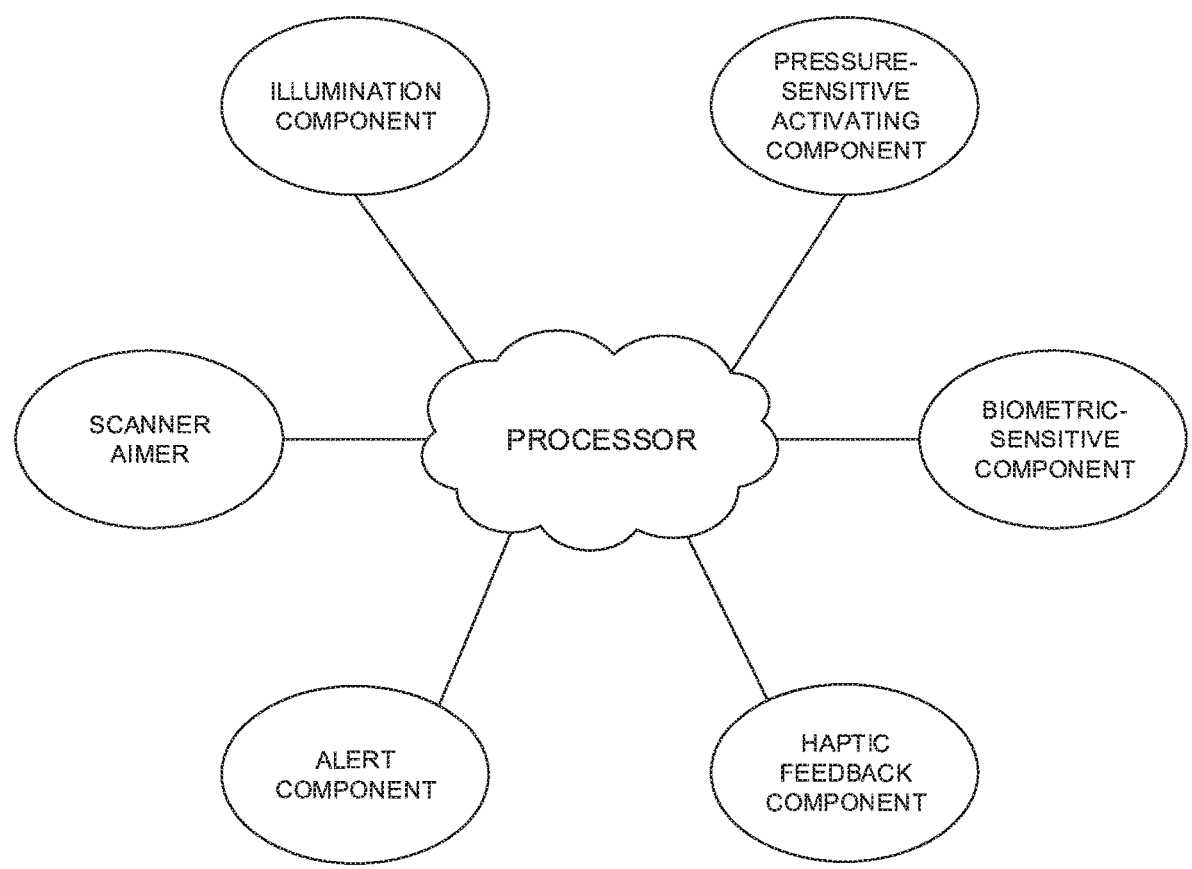
FIG. 5 depicts a diagram of components forming an example scanning system, in accordance with an aspect of the present technology.

FIG. 5 is a diagram of components that may be communicatively connected to each other and incorporated into a scanner, such as the scanner 28A shown in FIG. 2A or the scanner 28B shown in FIG. 2B for example, to thereby enable the functionalities described herein. As shown in the example of FIG. 5, a processor, an illumination component, a pressure-sensitive component, a biometric-sensitive component, a haptic feedback component, a scanner aimer, and an alert component are provided. It should be noted that not all components may be implemented in the scanner aspects described herein or additional or alternative components or configurations of components may be used with different scanner aspects described herein. Thus, the selection of components provided in FIG. 5 is presented as one non-limiting example.

The scanner through the communicatively connected components may be operable to activate a scanning and/or illumination function as described herein, but may also be operable to activate additional functionalities, such as activating a scanner aimer. The scanner aimer is a light array that can project light from the scanner onto a surface so that a user can visibly see the area where the scanner will perform a scan function. For example, referring to FIG. 2A, when a certain pressure is applied to the pressure-sensitive component 30A of the scanner 28A, this pressure may activate the function of turning on the scanner aimer. The user may then guide the light array to the indicia to be read, where the scanning function may then be performed by applying a different and/or another pressure to the pressure-sensitive component 30A of the scanner 28A.

With continued reference to FIG. 5, the processor is operable to activate a plurality of functions of the scanner (e.g., as discussed with respect to FIGS. 2A and 2B) using the communicatively connected components. In some aspects, the processor may be configured to activate at least a function of one of many pluralities of functions of the scanner. For example, a plurality of functions may include scanning an indicia, adjusting the illumination level of an illumination component of the scanner, turning on and/or off the scanner, turning on and/or off the scanner aimer (which may or may not be included in a hand-held scanner), identifying a user of the scanner, and/or providing a haptic feedback.

The scanner may be configured to enable activation of different configurations of functions (e.g., based on unique biometric data that is detected by the scanner). Each configuration of functions, when enabled, may have the same, different, or a combination of functions that can be activated. In this way, for one configuration of functions that are activated based on a detected biometric data indicating that one user is using the scanner, the functions may be configured to operate, and haptic feedback may be configured to be provided, in accordance with a unique configuration associated with that one user, and the same may be true, or a different configuration may be provided, for another user that is identified based on a detected biometric data.

Figure 6:
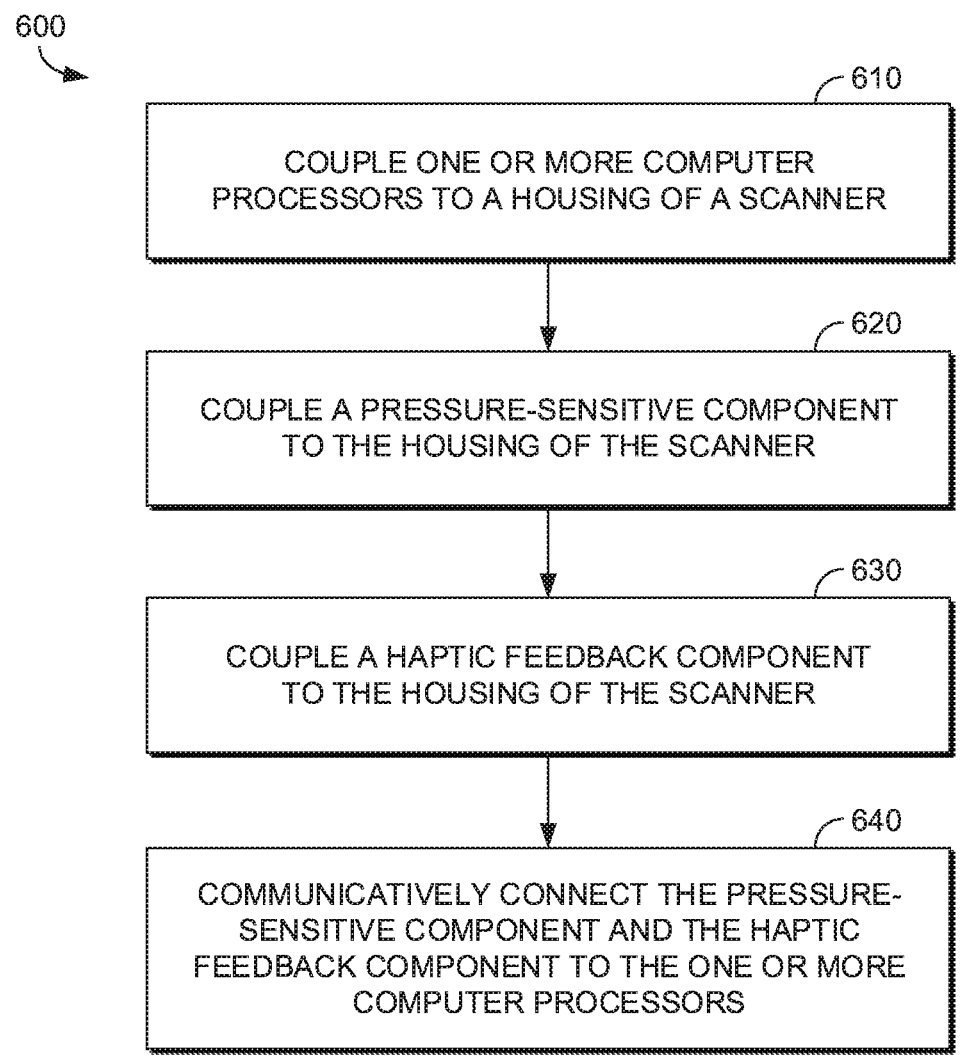
FIG. 6 is a block diagram representing one example method of manufacturing a scanner, in accordance with an aspect of the present technology.

FIG. 6 depicts a block diagram of an example method 600 of manufacturing and/or assembling a scanner, such as the scanner 28A shown in FIG. 2A or the scanner 28B shown in FIG. 2B, useable for reading machine-readable indicia, in accordance with an aspect of the present technology. At block 610, one or more computer processors are coupled to a housing of the scanner, such as the scanner 28A shown in FIG. 2A. At block 620, a pressure-sensitive component, such as the pressure-sensitive component 30A shown in FIG. 2A, is coupled to the housing of the scanner. As described herein, the pressure-sensitive component may be configured to detect a pressure applied thereto, to enable different functions of the scanner to be activated. The pressure-sensitive component may present an external active surface, such as the external active surface 39A shown in FIG. 2A, where a pressure can be applied by a user. At block 630, a haptic feedback component is coupled to the housing of the scanner. As described herein, the haptic feedback component may be configured to provided different haptic feedbacks to a user depending on which scanner function is activated, or based on the outcome or result of a common scanner function that is activated (e.g., a completed scan or a missed scan, which may be associated with different generated haptic feedbacks). The haptic feedback component may also provide each of the plurality of haptic feedbacks on a surface at least in part coincident with the external active surface of the pressure-sensitive component. At block 640, the pressure-sensitive component and the haptic feedback component are communicatively coupled to the one or more computer processors. As described herein, the one or more processors may be configured to activate a first haptic feedback or a second haptic feedback of the plurality of haptic feedbacks in response to a first function of the scanner being activated.

The present technology has been described in relation to particular aspects, which are intended in all respects to be illustrative rather than restrictive. Many different arrangements of the various components depicted, as well as use of components not shown, are possible without departing from the spirit and scope of the present disclosure. Alternative aspects will become apparent to those skilled in the art that do not depart from the scope. It will be understood that certain features and subcombinations are of utility and may be employed without reference to other features and subcombinations and are contemplated as within the scope of the claims.

What is claimed is:

1. A scanner useable for scanning machine-readable indicia, the scanner comprising:
 a pressure-sensitive component presenting an external active surface where a pressure can be applied by a user, the pressure-sensitive component adapted to activate at least one function of the scanner;
 a haptic feedback component adapted to provide a plurality of haptic feedbacks, wherein the haptic feedback component provides each of the plurality of haptic feedbacks on a surface at least in part coincident with the external active surface of the pressure-sensitive component; and
 one or more computer processors communicatively connected to the pressure-sensitive component and the haptic feedback component and operable to activate:
  a first haptic feedback or a second haptic feedback of the plurality of haptic feedbacks in response to a first function of the at least one function of the scanner being activated, wherein the pressure-sensitive component is adapted to detect a location on the external active surface where a contact is made, and wherein the one or more computer processors are operable to activate the first function of the at least one function or a second function of the at least one function based on the detected location of the contact.

2. The scanner of claim 1, wherein the first function comprises a scanning function, and wherein the first haptic feedback is associated with a completed scan and the second haptic feedback is associated with a missed scan.

3. The scanner of claim 1, further comprising:
 an illumination component adapted to generate illumination at one of a plurality of illumination levels, wherein the first function comprises the illumination component generating illumination at one of the plurality of illumination levels,
 wherein the first haptic feedback is associated with a first illumination level of the plurality of illumination levels being generated, and
 wherein the second haptic feedback is associated with a second illumination level of the plurality of illumination levels being generated.

4. A scanner of useable for scanning machine-readable indicia, the scanner comprising:
 a pressure-sensitive component presenting an external active surface where a pressure can be applied by a user, the pressure-sensitive component adapted to activate at least one function of the scanner;
 a haptic feedback component adapted to provide a plurality of haptic feedbacks, wherein the haptic feedback component provides each of the plurality of haptic feedbacks on a surface at least in part coincident with the external active surface of the pressure-sensitive component and
 one or more computer processors communicatively connected to the pressure-sensitive component and the haptic feedback component and operable to activate:
  a first haptic feedback or a second haptic feedback of the plurality of haptic feedbacks in response to a first function of the at least one function of the scanner being activated, wherein the pressure-sensitive component is adapted to detect a number of distinct contacts made with the external active surface of the pressure-sensitive component, and wherein the one or more computer processors are operable to activate the first function of the at least one function or a second function of the at least one function based on a number of simultaneous contacts made with the external active surface of the pressure-sensitive component.

5. A scanner useable for scanning a machine-readable indicia, the scanner comprising:
   a biometric-sensitive component adapted to enable activation of a first plurality of functions of the scanner or a second plurality of functions of the scanner,
   wherein the first plurality of functions of the scanner are enabled based on at least a first biometric contact being detected by the biometric-sensitive component, and
   wherein the second plurality of functions of the scanner are enabled based on at least a second biometric contact being detected by the biometric-sensitive component;
   a haptic feedback component adapted to provide a plurality of haptic feedbacks; and
   one or more computer processors communicatively connected to the biometric-sensitive component and the haptic feedback component and operable to activate:
   a first haptic feedback or a second haptic feedback of the plurality of haptic feedbacks based on one of the first plurality of functions being activated.

6. The scanner of claim 5, further comprising a pressure-sensitive component presenting an external active surface where a pressure can be applied by a user, the pressure-sensitive component communicatively connected to the one or more computer processors, wherein the pressure-sensitive component is adapted to activate the one of the first plurality of functions based on a first pressure being applied to the pressure-sensitive component in association with the first biometric contact.

7. The scanner of claim 6, wherein the haptic feedback component provides each of the plurality of haptic feedbacks on a surface at least in part coincident with the external active surface of the pressure-sensitive component.

8. The scanner of claim 6, wherein the biometric-sensitive component is a fingerprint sensor, and wherein the fingerprint sensor presents another external active surface at least in part coincident with the external active surface of the pressure-sensitive component.

9. The scanner of claim 5, wherein the biometric-sensitive component is adapted to identify a biometric data based on a biometric contact, and wherein the one or more computer processors are further operable to activate the one of the first plurality of functions based on the biometric data identified by the biometric-sensitive component.

10. The scanner of claim 9, wherein the biometric data identifies a first digit, the first digit corresponding to the one of the first plurality of functions, wherein the one of the first plurality of functions comprises a scanning process.

11. The scanner of claim 5, further comprising an alert component configured to provide an alert when the one of the first plurality of functions of the scanner is activated.

12. The scanner of claim 6, further comprising a receiving plate comprising the pressure-sensitive component and the haptic feedback component.

13. The scanner of claim 5, wherein the one or more computer processors are operable to activate the first plurality of functions based on determining a user of the scanner meets a security threshold from a biometric contact with the biometric-sensitive component.

14. The scanner of claim 5, wherein the one or more computer processors are operable to associate the scanner to a specific user profile in an external computing system based on determining the specific user from a biometric contact with the biometric-sensitive component.

15. The scanner of claim 14, wherein the external computing system is a cashier system in a retail location.

16. A method of manufacturing a scanner useable for reading a machine-readable indicia, the method comprising:
   coupling one or more computer processors to a housing of the scanner;
   coupling a pressure-sensitive component to the housing of the scanner, the pressure-sensitive component presenting an external active surface where a pressure can be applied by a user, the pressure-sensitive component adapted to activate at least one function of the scanner;
   coupling a haptic feedback component to the housing of the scanner, the haptic feedback component adapted to provide a plurality of haptic feedbacks, wherein the haptic feedback component provides each of the plurality of haptic feedbacks on a surface at least in part coincident with the external active surface of the pressure-sensitive component;
   coupling a receiving plate to the housing of the scanner, wherein the receiving plate comprises the pressure-sensitive component and the haptic feedback component
   communicatively connecting the pressure-sensitive component and the haptic feedback component to the one or more computer processors, wherein the one or more computer processors are operable to activate:
   a first haptic feedback or a second haptic feedback of the plurality of haptic feedbacks in response to a first function of the at least one function of the scanner being activated.

17. The method of claim 16, wherein the first function comprises a scanning function, and wherein the first haptic feedback is associated with a completed scan and the second haptic feedback is associated with a missed scan.

18. The method of claim 16, further comprising:
   coupling an illumination component adapted to generate illumination at one of a plurality of illumination levels to the housing of the scanner,
   wherein the first haptic feedback is associated with a first illumination level of the plurality of illumination levels being generated, and
   wherein the second haptic feedback is associated with a second illumination level of the plurality of illumination levels being generated.

19. The method of claim 16, wherein the pressure-sensitive component is adapted to detect a location on the external active surface where a contact is made, and wherein the one or more computer processors are operable to activate the first function of the at least one function or a second function of the at least one function based on the detected location of the contact.

20. The method of claim 16, wherein the pressure-sensitive component is adapted to detect a number of distinct contacts made with the external active surface of the pressure-sensitive component, and wherein the one or more computer processors are operable to activate the first function of the at least one function or a second function of the at least one function based on a number of simultaneous contacts made with the external active surface of the pressure-sensitive component.

* * * * *